US012741319B2

(12) United States Patent
Wesley et al.

(10) Patent No.: US 12,741,319 B2
(45) Date of Patent: Sep. 22, 2026

(54) EXHAUST SYSTEM FOR SUPPORT REMOVAL APPARATUS

(71) Applicant: PostProcess Technologies, Inc., Buffalo, NY (US)

(72) Inventors: Anthony Wesley, Machias, NY (US); Michael Russell Valvo, East Aurora, NY (US); Gary Douglas Burch, West Seneca, NY (US); Daniel Hutchinson, Orchard Park, NY (US)

(73) Assignee: PostProcess Technologies, Inc., Buffalo, NY (US)

( * ) Notice: Subject to any disclaimer, the term of this patent is extended or adjusted under 35 U.S.C. 154(b) by 336 days.

(21) Appl. No.: 18/266,090

(22) PCT Filed: Dec. 14, 2021

(86) PCT No.: PCT/US2021/063330

§ 371 (c)(1),
(2) Date: Jun. 8, 2023

(87) PCT Pub. No.: WO2022/132785

PCT Pub. Date: Jun. 23, 2022

(65) Prior Publication Data

US 2024/0091860 A1 Mar. 21, 2024

Related U.S. Application Data

(60) Provisional application No. 63/126,151, filed on Dec. 16, 2020.

(51) Int. Cl.
*B22F 10/68* (2021.01)
*B01D 53/00* (2006.01)
(Continued)

(52) U.S. Cl.
CPC ............ *B22F 10/68* (2021.01); *B01D 53/002* (2013.01); *B08B 15/02* (2013.01); *B22F 10/40* (2021.01);
(Continued)

(58) Field of Classification Search
CPC ......... B29C 64/35; B08B 5/04; B08B 15/002; B22F 10/68; B22F 12/17; B22F 12/70; B33Y 40/20
See application file for complete search history.

(56) References Cited

U.S. PATENT DOCUMENTS 2,573,290 A 10/1951 Van Guilder
4,622,039 A 11/1986 Merenda
(Continued)

FOREIGN PATENT DOCUMENTS

DE 202012100809 U1 3/2012
DE 102014108614 A1 12/2015
(Continued)

OTHER PUBLICATIONS

Extended European Search Report from Application No. 21907639, dated Oct. 29, 2024, 15 pages.
(Continued)

*Primary Examiner* — Nelson J Nieves
(74) *Attorney, Agent, or Firm* — Lempia Summerfield Katz LLC

(57) ABSTRACT

An improved exhaust system and method for an apparatus that removes support material from additively manufactured parts is disclosed. The apparatus includes an enclosed chamber in which the additively manufactured parts are placed. A heated detergent fluid is sprayed at the additively manufactured parts. The improved exhaust system exhausts heated air from the chamber. The improved exhaust system includes an exhaust channel having an inlet end open to the chamber
(Continued)

through which heated air from the chamber is caused to flow. Relatively cooler air is caused to flow across the outside of the exhaust channel. When the heated air from the chamber encounters the exhaust channel across which the relatively cooler air is caused to flow, evaporated fluids in the heated air condense and fall back into the chamber. The improved exhaust system can be retrofitted onto older models of the support removal apparatus that do not have the improved exhaust system.

13 Claims, 8 Drawing Sheets

(51) Int. Cl.

| | |
|---|---|
| ***B08B 15/02*** | (2006.01) |
| ***B22F 10/40*** | (2021.01) |
| ***B22F 10/62*** | (2021.01) |
| ***B22F 12/70*** | (2021.01) |
| ***B29C 64/35*** | (2017.01) |
| ***B29C 64/40*** | (2017.01) |
| ***B33Y 40/20*** | (2020.01) |

(52) U.S. Cl.
CPC .............. *B22F 10/62* (2021.01); *B22F 12/70* (2021.01); *B29C 64/35* (2017.08); *B29C 64/40* (2017.08); *B33Y 40/20* (2020.01); *B01D 2257/708* (2013.01)

(56) References Cited

U.S. PATENT DOCUMENTS 5,232,476 A * 8/1993 Grant ...................... D06F 43/08 96/201
5,509,851 A 4/1996 Heuschkel
2013/0192646 A1* 8/2013 Wittendorfer ........ B01D 53/002 15/300.1
2016/0074911 A1 3/2016 Dore
2016/0207147 A1* 7/2016 Van Hassel ............. B22F 12/70
2018/0215106 A1 8/2018 Mcmahon et al.
2019/0176403 A1* 6/2019 Hutchinson ............ B33Y 40/20
2019/0202126 A1* 7/2019 Hutchinson ............. B05B 14/40
2019/0270138 A1* 9/2019 Ullmann ................. B22F 10/77
2021/0205928 A1* 7/2021 Beeby .................. B23K 26/144
2021/0370404 A1* 12/2021 Puigardeu Aramendia ................. B22F 10/32
2021/0394241 A1* 12/2021 Radermacher ........ B08B 15/002
2022/0219398 A1* 7/2022 Nishi .................... B29C 64/321
2022/0379256 A1* 12/2022 Mansell .................. B22F 3/003

FOREIGN PATENT DOCUMENTS

GB 2036300 A 6/1980
WO 2021221599 A1 11/2021

OTHER PUBLICATIONS

International Search Report and Written Opinion of the International Searching Authority from International Patent Application No. PCT/US2021/063330, dated Mar. 1, 2022, 9 pages.

* cited by examiner

EXHAUST SYSTEM FOR SUPPORT REMOVAL APPARATUS

CROSS-REFERENCE TO RELATED APPLICATION

The present patent document is a § 371 nationalization of PCT Application Serial No. PCT/US2021/063330, filed Dec. 14, 2021, designating the United States, which is hereby incorporated by reference, and this patent document also claims the benefit of the filing date under 35 U.S.C. § 119 (e) of U.S. Provisional Application Ser. No. 63/126,151 filed Dec. 16, 2020 which is hereby incorporated by reference in its entirety.

This application is related to U.S. patent application Ser. No. 16/232,955, filed on Dec. 26, 2018, now U.S. Pat. No. 10,850,449, the entire disclosure of which is incorporated by reference herein.

FIELD OF THE INVENTION

This invention relates generally to an exhaust system for an apparatus for removing support material from parts that have been made by additive manufacturing.

BACKGROUND OF THE INVENTION

Additive manufacturing processes (also referred to as 3D printing) enable the production of parts having complex geometries that would be difficult or impossible with traditional manufacturing techniques, such as casting, injection molding, or forging. Additive manufacturing processes include for example Selective Laser Sintering (SLS), Stereolithography (SLA), fused deposition modeling (FDM), material jetting (MJ), electron beam (e-beam), and others. One drawback is that some additive manufacturing processes produce parts that may require removal of unwanted support material. The support material is needed during the additive manufacturing process to support portions of the part as the part is being manufactured. After the additive manufacturing process is completed, the unwanted support material needs to be removed. The support material can have a complex geometry and can also be extensive.

Additionally, because additive manufacturing produces a part in discrete layers, the surface of a part may be rough because adjacent layers may not line up exactly thereby leaving a striated surface. Such a surface is unappealing from a visual standpoint and can cause stress concentrations, which could develop during testing or use of the part leading to premature failure.

Prior approaches to address the need to remove support material from additively manufactured parts include manual approaches, such as using sandpaper or brushes, or machines, such as chemical baths or agitators. These prior approaches have drawbacks, such as being time-consuming inefficient, inconsistent, and potentially damaging to the part.

PostProcess Technologies, Inc., of Buffalo, NY, has developed several product lines of solutions to meet the need for support removal from additively manufactured parts. These solutions include the BASE™ and the DECI™ support removal solutions. These PostProcess® solutions remove support material from parts made by various additive manufacturing processes including FDM, SLA, CLIP, PolyJet, and more. These PostProcess® solutions use the PostProcess® Volumetric Velocity Dispersion (VVD) technology. The VVD technology includes high volume and flow streams of detergent spraying bidirectionally at the additively manufactured parts. These PostProcess® solutions remove support material in a consistent, efficient and high quality manner. However, there continues to be room for improvements.

SUMMARY OF THE INVENTION

The invention comprises an improved exhaust system for an apparatus that removes support material from additively manufactured parts. The additively manufactured parts are placed on a platform in an enclosed chamber of the apparatus and a heated detergent fluid is sprayed at the additively manufactured parts. The improved exhaust system exhausts heated air from the chamber. The improved exhaust system includes an exhaust channel having an inlet end open to the chamber through which heated air from the chamber is caused to flow. Relatively cooler air is caused to flow across the outside of the exhaust channel. The relatively cooler air is caused to flow from an area, such as ambient room air. When the heated air from the chamber encounters the exhaust channel across which the relatively cooler air is caused to flow, evaporated fluids, including volatile organic compounds and water, in the heated air condense and fall back into the chamber.

BRIEF DESCRIPTION OF THE DRAWINGS

For a fuller understanding of the nature and objects of the invention, reference should be made to the accompanying drawings and the subsequent description.

FIG. 5 is a cutaway view of an alternative embodiment of the multi-channel unit shown in FIG. 4.

FIG. 6 is a perspective view showing the multi-channel unit of FIG. 5 mounted on the chamber of the apparatus for removing support material from additively manufactured parts shown in FIG. 1.

DETAILED DESCRIPTION OF THE INVENTION

Like drawing numbers on different drawing views identify identical, or functionally similar, structural elements of the invention.

Furthermore, it is understood that this invention is not limited to the particular methodology, materials, or modifications described and, as such, the invention may vary from that which is disclosed herein. It is also understood that the terminology used herein is for the purpose of describing particular aspects, and this invention is not limited to the disclosed aspects.

Unless defined otherwise, all technical and scientific terms used herein have the same meaning as commonly understood to one of ordinary skill in the art to which this invention pertains. It should be understood that methods, devices or materials similar or equivalent to those described herein can be used in the practice or testing of the method and apparatus.

Furthermore, as used herein, “and/or” is intended to mean a grammatical conjunction used to indicate that one or more of the elements or conditions recited may be included or occur.

I. Volumetric Velocity Dispersion Support Removal

A. Apparatus

Figure 1:
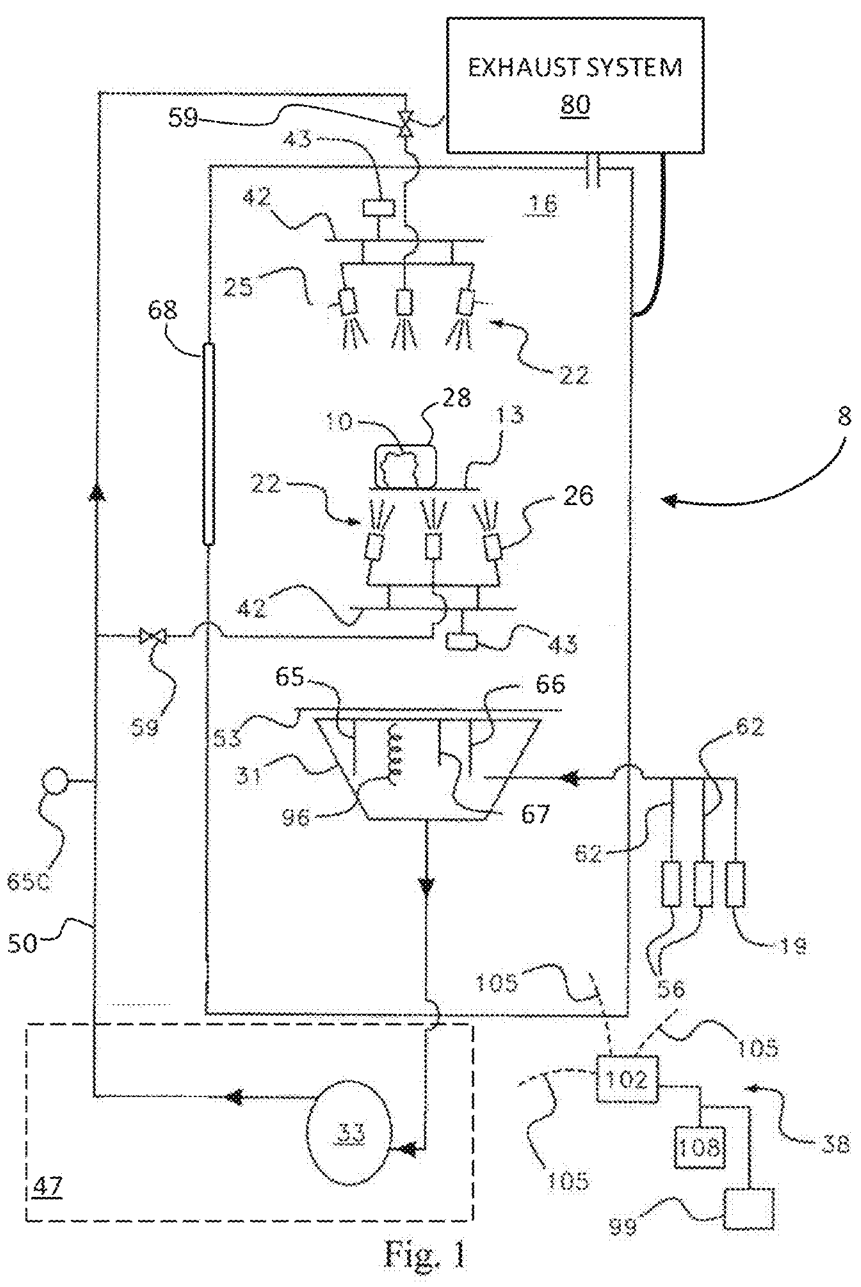
FIG. 1 is a schematic depiction of an apparatus for removing support material from additively manufactured parts.

FIG. 1 depicts an apparatus 8 for removal of support material from additively manufactured parts. In one embodiment, the apparatus 8 is similar to a BASE™ or a DECI™ support removal solution manufactured by PostProcess Technologies, Inc., of Buffalo, NY. These PostProcess® solutions remove support material from parts made by various additive manufactured processes including FDM, SLA, CLIP, PolyJet, and others. These PostProcess® solutions use the PostProcess® Volumetric Velocity Dispersion (VVD) technology. The VVD technology includes a plurality of high volume and flow jet streams spraying bidirectionally. In one embodiment, the apparatus 8 is similar or identical to apparatuses disclosed in the aforementioned U.S. patent application Ser. No. 16/232,955, filed on Dec. 26, 2018, now U.S. Pat. No. 10,850,449.

Referring again to FIG. 1, additively manufactured parts 10 needing removal of support material are placed on a platform 13 in a chamber 16 of the apparatus 8. A door 68 provides access to the interior of the chamber 16. Support material 28 encases, surrounds, and/or is attached to the additively manufactured parts 10. Upper nozzles 25 are located above the platform 13 and lower nozzles 26 are located below the platform 13.

The top nozzles 25 are mounted to a movable track 42 connected to an actuator 43 that causes the nozzles 25 to oscillate in the horizontal direction.

A tank 31 open at its upper side is located below the lower nozzles 26. The upper nozzles 25 and lower nozzles 26 are oriented to spray a fluid 22 (also referred to as a detergent or solvent) at the parts 10 located on the platform 13. The platform 13 has openings of suitable size, quantity and arrangement so that the platform 13 can support the parts 10 yet allow passage of the fluid 22 being sprayed at the parts 10 from the bottom nozzles 26. The openings in the platform 13 allow the fluid 22 sprayed at the parts 10 from both the upper nozzles 25 and lower nozzles 26 to flow down into the tank 31. The openings in the platform 13 are small enough to prevent some pieces of support material 28 that detach from the parts 10 from falling down into the tank 31. In one embodiment, the platform 13 is a lattice.

A mesh screen 53 is located between the tank 31 and the lower nozzles 26 to prevent pieces of detached support material 28 from falling into the tank 31.

A pump 33 is located in a compartment 47 adjacent to the chamber 16. The pump 33 draws the fluid 22 from the tank 31 and then conveys the fluid 22 through piping 50 connected to the upper nozzles 25 and lower nozzles 26 causing the fluid 22 to spray out of the upper nozzles 25 and lower nozzles 26 at the parts 10. The upper nozzles 25 and lower nozzles 26 each comprise a pipe or tube section having multiple apertures or separate individual nozzles through which the fluid 22 sprays. After being sprayed at the parts 10, the fluid 22 then collects back into the tank 31 where the fluid 22 is recycled, i.e., drawn from the tank 31, pumped back to the upper nozzles 25 and lower nozzles 26, sprayed at the parts 10, and collected in the tank 31. In this mode of operation the apparatus 8 is a closed-loop system.

A heater 96, such as an immersion heater, and a temperature sensor 67 for measuring temperature are located in or in connection with the tank 31. The heater 96 heats the fluid 22 to a desired temperature and, based on feedback from the temperature sensor 67, maintains the fluid 22 at that temperature. The heater 96 heats the fluid 22 to a desired temperature within an allowable range, e.g., 30° C.-70° C. (85° F.-160° F.), or another suitable range. The fluid 22 in the tank 31 may be heated to the desired temperature prior to starting the support removal process to spray the parts 10, or alternatively the fluid 22 can be sprayed before it is heated or when it is only partially heated to the desired temperature.

A liquid level sensor 65 is located in the tank 31 and operable to detect the level of the fluid 22 in the tank 31. The liquid level sensor 65 enables a determination of when to add or stop adding fluid 22 to the apparatus 8 based on the selected operating parameters.

A pH sensor 66 is located in or in connection with the tank 31. The pH sensor 66 measures the pH of the fluid 22 in the tank 31, which is indicative of the combination of liquids forming the fluid 22 (e.g., detergent solvent, water and anti-foaming agent). The pH can change during operation, for example due to dissolved support material 28 contaminating the fluid 22 or due to evaporation of the fluid 22. The compartment 47 also includes plumbing components for the apparatus 8, such as valves 59 and hoses 62. The compartment 47 can be located either below or to the side of the chamber 16.

Water is supplied from a facility water supply 19 or from a reservoir or other storage tank. Solvent (i.e., fluid or detergent 22) and anti-foaming agent are supplied from reservoirs 56 connected to the tank 31 by hoses 62 or other conduits. The hoses 62 for each of the fluid and anti-foaming agent may be connected to a mechanism, such as a pump, for automatically dispensing into the tank 31.

A human-machine interface (HMI) 38 is connected to a general-purpose computer having a central processing unit (CPU) 102. The HMI 38 can include appropriate components such as a touch screen 108. The general-purpose computer 102 has hardwired or wireless links 105 for sending and receiving signals to and from components of the apparatus 8 for the control and monitoring thereof.

An operator can use the HMI 38 to select various operating parameters. These parameters can be set individually or by selecting a pre-stored recipe. The amount of detergent fluid sprayed, the direction of spray (from top and/or bottom), the location of spray (e.g., left versus right side of part or top versus bottom side of part), the pressure at which the fluid detergent is pumped to the nozzles, the agitation level, and the degree of atomization, as well as other parameters such as the make-up, temperature and pH of the fluid, can be adjusted to create different combinations or recipes of these parameters in order to efficiently and effectively remove a given type of support material for a given type of build material and geometric design of additively manufactured part. An operator can set or change these parameters using the HMI 38.

The apparatus 8 can be pre-programmed with recipes of the parameter settings known to be suitable for various support and build materials, part geometries, etc. Additionally, the operator can set parameters and save them as a recipe, which the operator can then select in the future rather than re-inputting each of the settings.

The apparatus 8 includes a logic controller 99 to control operation between the CPU 102 and the HMI 38. The HMI 38 and CPU 102 may be connected to the Internet in order to be operated and monitored remotely. Additionally, this Internet connection enables use of a remote database that contains a plurality of test parameters and additional recipes that may be used to optimize the support removal process. Alternatively, a database may be located locally with the apparatus 8 itself and be uploaded periodically to a remotely located storage device.

The fluid 22 is formulated for use for support removal from parts made by MJ, SLA and FDM. The fluid 22 can also include an anti-foaming agent. The fluid 22 dissolves support material 28 and may be an aqueous-based chemical formulation made with a single chemical or a combination of chemicals. Suitable detergents are available from Post-Process Technologies, Inc., including PLM-101-SPRAY, PLM-401-SPRAY, and PLM-201-SPRAY. Suitable detergents are disclosed in WO 2020/006141, WO2020056316A1, U.S. Ser. No. 63/300,670, filed Mar. 27, 2020, and U.S. Ser. No. 63/107,881, filed Oct. 30, 2020, the entire disclosures of which are incorporated by reference herein.

The apparatus includes an exhaust system 80. The exhaust system 80 is described in more detail below.

B. Operation

Figure 3:
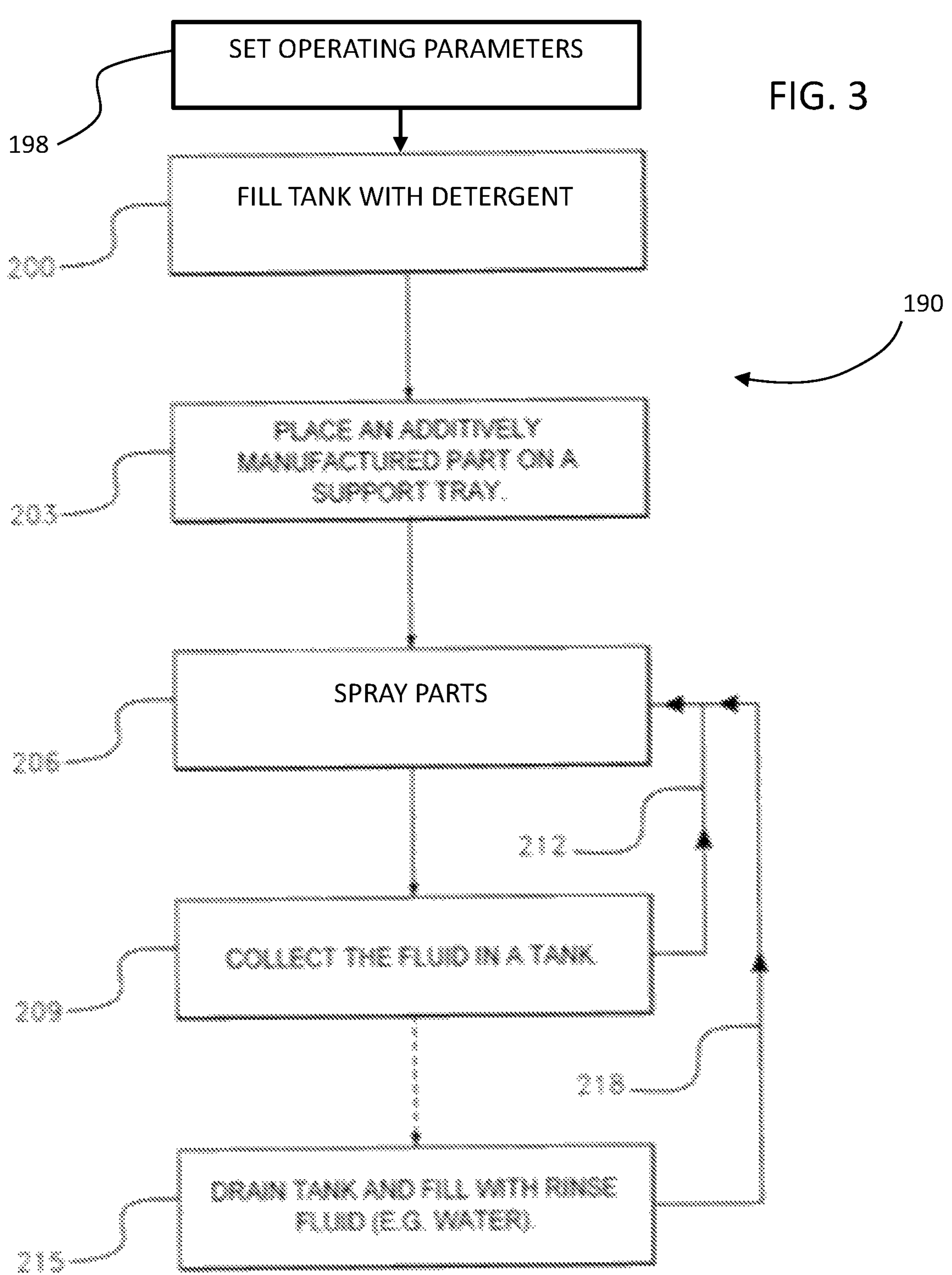
FIG. 3 is a flow diagram showing a method of operating the apparatus in FIG. 1.

FIG. 3 shows a method 190 of operation of the apparatus 8 for support removal from additively manufactured parts. An operator uses the HMI 38 to input parameters for operating the apparatus 8 (Step 198). These parameters may include temperature of the fluid, pH of the fluid 22, run time, agitation level, position of the spray nozzles, oscillation distance, and the speed of oscillation. The tank 31 is filled with fluid (detergent) based on parameters set by the operator or as may be pre-stored in connection with a given operating recipe that the operator selects (Step 200).

The one or more additive manufactured parts 10 are placed on the tray 13 in the chamber 16 (Step 203). The heater 96 in the tank 31 heats the fluid 22 to a temperature specified in the operating parameters chosen for the support removal process. In one embodiment, the specified temperature is approximately 55° C. The heater 96 in the tank 31 also heats the air in the chamber 16. When the fluid 22 is at the appropriate temperature, spraying of the parts begins (Step 206). In one exemplary mode of operation, the parts 10 are sprayed at a rate of 0.75 cubic meters per minute (200 GPM) at a pressure of 2.4 kg/cm 2 (35 PSI). After being sprayed at the parts, the fluid 22 then passes through the openings in the tray 13 and collects in the tank 31 (Step 209). The fluid 22 cycles through the nozzles 25 again as the pump 33 continues to draw fluid 22 from tank 31 (Step 212). This cycling of the fluid 22 continues for the duration of the run time of the support removal process.

As stated above, during the support removal process, heat from the fluid 22 in the tank 31 heats up the air in the chamber 16. The heated air in the chamber 16 helps maintain the fluid 22 at the desired temperature while the fluid 22 is sprayed at the parts 10.

As the apparatus 8 runs for a period of time at its operating temperature, some of the fluid 22 evaporates. In order to maintain an appropriate amount of fluid 22 in the apparatus 8, a desired fluid level is set in the software, and the fluid level in the tank 31 is monitored using the liquid level sensor 65. If the liquid level falls below the desired level, the apparatus 8 supplies additional amounts of one or more components of the detergent fluid 22 (e.g., water, solvent, anti-foaming agent) into the tank 31.

At the end of a support removal and/or rinse cycle, the heater 96 in the tank 31 may be kept operating to maintain the heat in the chamber 16, which may be useful for drying the parts 10.

II. Exhaust System

A. First Embodiment

Figure 2:
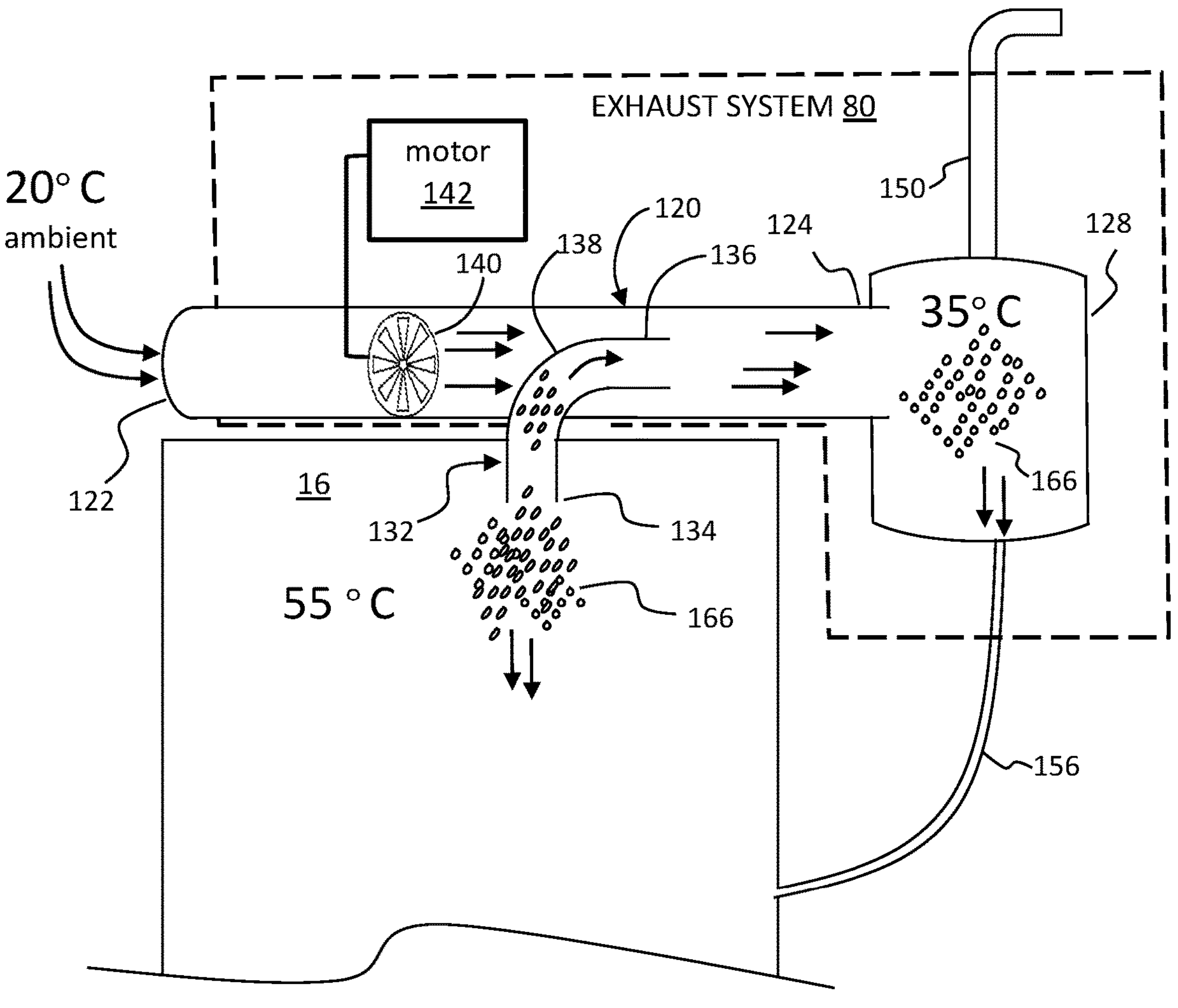
FIG. 2 is a schematic depiction of the exhaust system shown in FIG. 1.

FIG. 2 is a diagram of the exhaust system 80 according to a first embodiment. The exhaust system 80 removes air and volatile organic compounds (VOCs) from the chamber 16. The exhaust system 80 is located above the chamber 16. The exhaust system 80 includes an air supply channel (or duct) 120. The air supply channel 120 extends horizontally across the exhaust system 80 above the chamber 16. The air supply channel 120 has a circular cross section. Alternatively, the air supply channel 120 may have a cross section of another shape. In one embodiment, the cross sectional diameter of the air supply channel 120 is approximately 6.67 cm, although other dimensions may be suitable.

A first end 122 of the air supply channel 120 is open to ambient air. An opposite end 124 of the air supply channel 120 connects to and opens into a collection canister 128. An exhaust channel (or duct) 132 connects the chamber 16 to the air supply channel 120 of the exhaust system 80. The exhaust channel 132 provides for passage of gaseous fluid (i.e., gases, air, vapor) from the chamber 16 to the air supply channel 120. In this embodiment, the exhaust channel 132 has an elbow shape. The exhaust channel 132 has an inlet end 134 open to the chamber 16. The inlet end 134 is oriented vertically downward into the chamber 16. The exhaust channel 132 has an outlet end 136 open into the air supply channel 120. The outlet end 136 is oriented horizontally in a downstream direction in the air supply channel 120 oriented toward the collection canister 128. The exhaust channel 132 has a middle section 138 between the inlet end 134 and the outlet end 136. The middle section 138 includes a curved 90 degree bend. The outlet end 136 of the exhaust channel 132 has a cross sectional dimension that is smaller than the interior dimension of the air supply channel 120. Because the cross sectional dimension of the exhaust channel 132 is smaller than the interior dimension of the air supply channel 120, there is space around the exterior of the outlet end 136 of the exhaust channel 132 to allow for the flow of air through the air supply channel 120 around the outlet end 136 of the exhaust channel 132. In one embodiment, the cross sectional diameter of the exhaust channel 132 is approximately 4.13 cm at the outlet end 136, although other dimensions may be suitable. The exhaust channel 132 is composed of plastic although other materials may be suitable.

A fan 140 is located in the air supply channel 120 upstream from the location at which the exhaust channel 132 enters the air supply channel 120. The fan 140 is located in the air supply channel 120 between the first end 122 of the air supply channel 120 and the location at which the exhaust channel 132 enters the air supply channel 120. A motor 142 is operatively connected to the fan 140. The motor 142 causes the fan 140 to draw air from the first end 122 of the air supply channel 120 and force the air drawn from the first end 122 through the air supply channel 120 toward the collection canister 128. In one embodiment, the fan 140 operates to draw air at approximately 2000 cm per second.

The collection canister 128 located at the second end 124 of the air supply channel 120 is a closed vessel having a generally barrel shape. The collection canister 128 has a volume of approximately 0.0011 cubic meters and dimensions of approximately 9.53 cm in diameter by 15.56 cm tall. An elbow shaped outlet stack 150 extends from a top side of the collection canister 128. The outlet stack has a diameter of approximately 7.62 cm. A drain 156 extends from a bottom side of the collection canister 128. The drain 156 connects the collection canister 128 to the chamber 16 and provides a drainage path for fluid to flow from the collection canister 128 back to the chamber 16.

B. Operation of the First Embodiment of the Exhaust System

As stated above, the fluid 22 used in the apparatus 8 is heated to facilitate removal of support material from the parts 10. The fluid 22 is heated by the heater 96 located in the tank 31 from which the fluid 22 is drawn, pumped to the nozzles 25 and 26, and sprayed at the parts 10. The heated fluid 22 being sprayed at the parts 10 elevates the temperature of the air in the chamber 16. In one example, the air in the chamber 16 reaches a temperature of approximately 55° C. During operation as the parts 10 are being sprayed with fluid 22, some of the fluid 22 inside the chamber 16 evaporates causing the air inside the chamber 16 to become laden with evaporated fluid 22 including volatile organic compounds (VOCs) from the chemicals present in the fluid detergent.

In one mode of operation, the exhaust system 80 operates continuously during a full cycle of operation of the apparatus 8 as the additively manufactured parts 10 are being sprayed to remove support material. In this mode of operation, the fan 140 is run continuously to cause air to flow through the air supply channel 120. Air flow through the air supply channel 120 causes a reduction of pressure at the outlet end 136 of the exhaust channel 132. This reduction in pressure at the outlet end 136 of the exhaust channel 132 causes air to flow from the chamber 16 up into and through the exhaust channel 132 into the air supply channel 120 and then into the collection canister 128.

The exhaust system 80 draws in ambient air at approximately room temperature (e.g., 20° C.). The outside air being blown over the exhaust channel 132 cools the exhaust channel 132 including the middle section 138 thereof relative to the heated air being drawn through the exhaust channel 132 from the chamber 16. Thus, air flow through the air supply channel 120 causes the exhaust channel 132 including an inside surface thereof to remain at a temperature lower than the temperature of the air being drawn through the exhaust channel 132 from the chamber 16. The lower temperature of the exhaust channel 132 causes condensation of the evaporated liquids being drawn through the exhaust channel 132. This condensation forms into liquid droplets 166. The liquid droplets 166 formed in the exhaust channel 132 are relatively heavy and therefore fall back into the chamber 16. The droplets 166 that fall back into the chamber eventually fall into the tank 31 becoming part of the fluid 22 which is pumped to the nozzles 25 and 26 and sprayed at the parts 10 again.

The air drawn from the chamber 16 through the exhaust channel 132 continues to flow through the air supply channel 120 into the collection canister 128. Although the condensation that occurs in the exhaust channel 132 removes some of the evaporated fluid and VOCs in the air drawn from the chamber 16, the air drawn from the chamber 16 through the exhaust channel 132 and air supply channel 120 that collects in the collection canister 128 still contains some evaporated fluid and VOCs. The air in the collection canister 128 is cooler than the air in the chamber 12 because the air in the collection canister 128 is a mixture of the heated air from the chamber 16 and the air at ambient temperature from the inlet end 122 of the air supply channel 120. In one embodiment, the air in the collection canister 128 is approximately 35° C. At this temperature, some of the evaporated fluid and VOCs in the air in the canister 128 condense into droplets 168. These droplets fall to the bottom of the collection canister 128 and flow through the drain 156 back to the chamber 16. The droplets 168 that fall back into the chamber 16 eventually fall into the tank 31 becoming part of the fluid 22 which is pumped to the nozzles 25 and 26 and sprayed at the parts 10 again.

Some air that is drawn into the collection canister 128 exits from the collection canister 128 through the outlet stack 150.

C. Second Embodiment of the Exhaust System

Figure 4:
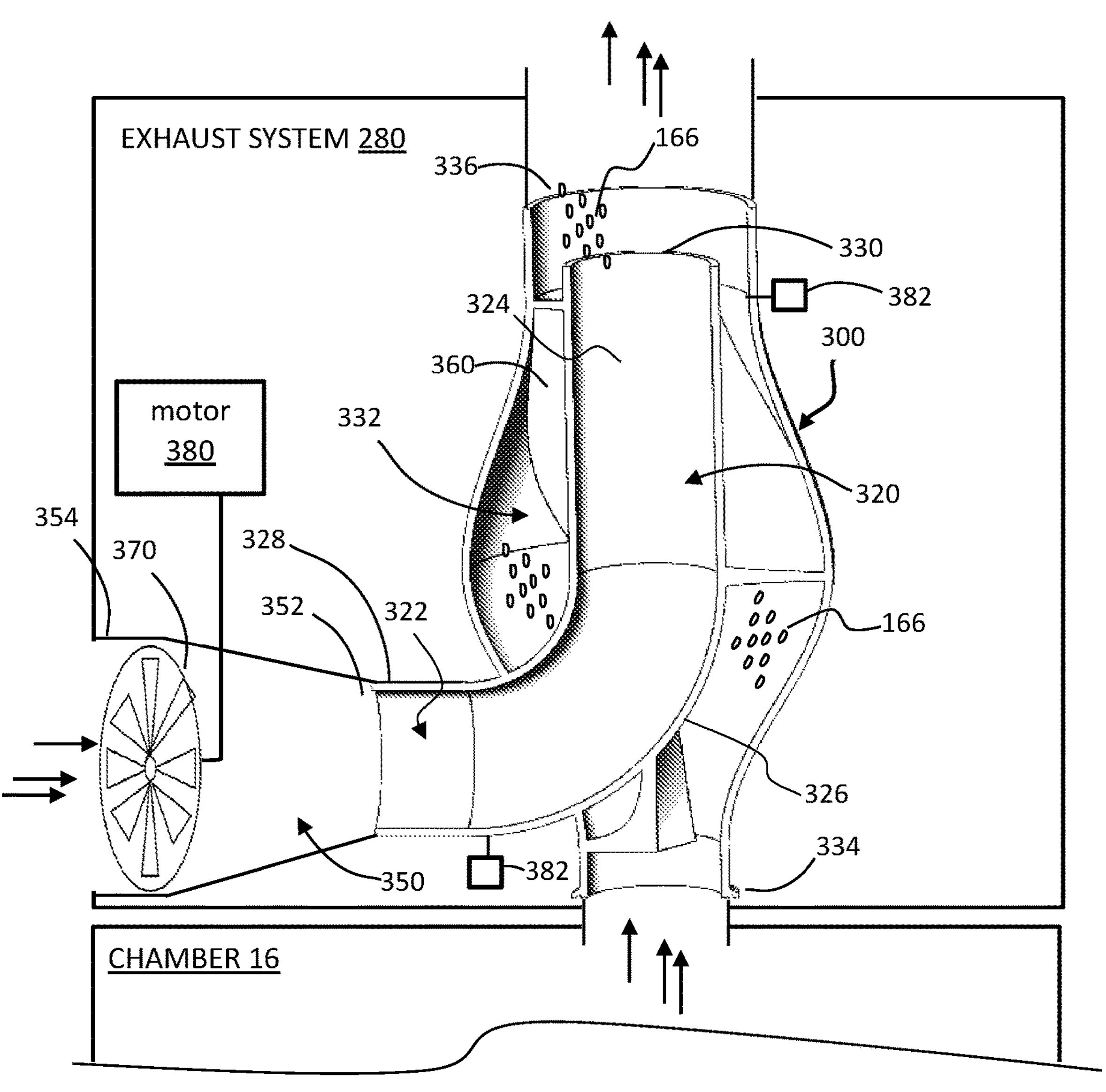
FIG. 4 is a cutaway view of a multi-channel unit which is a component in an alternative embodiment of the exhaust system shown in FIG. 1.

FIG. 4 shows an exhaust system 280 according to a second embodiment. The exhaust system 280 operates similarly to and provides similar functions as the exhaust system 80 shown in FIG. 2. Referring to FIG. 4, the exhaust system 280 includes a multi-channel unit 300. The multi-channel unit 300 is a component of the exhaust system 280. The multi-channel unit 300 includes an air supply channel 320 and an exhaust channel 332. In this embodiment, the multi-channel unit 300 is formed of a single piece of material with the air supply channel 320 and the exhaust channel 332 located therein. In this embodiment, the multi-channel unit 300 is composed of a durable material able to withstand high temperatures, such as nylon, ABS, or metal. Other durable materials may be suitable. In one embodiment, the multi-channel unit 300 is formed by an additive manufacturing process.

The air supply channel 320 is elbow-shaped with a horizontal portion 322, a vertical portion 324, and an elbow corner portion 326 joining the horizontal portion 322 to the vertical portion 324. An inlet end 328 of the air supply channel 320 is located at an end of the horizontal portion 322 and an outlet end 330 of the air supply channel 320 is located at a top end of the vertical portion 324. In one embodiment, the air supply channel 320 has an inner diameter of approximately 1½ inches (3.8 cm). The inlet end 328 of the air supply channel 320 connects to an outlet side 352 of an inlet duct 350. An inlet side 354 of the inlet duct 350 forms an opening to ambient air. The inlet duct 350 is formed of a suitable material, such as nylon, ABS, or metal.

The exhaust channel 332 is generally vertical with generally vertical walls. The exhaust channel 332 has a bulbous shape with a middle portion with a larger diameter than the top and bottom portions. In one embodiment, the exhaust channel 332 has an inner diameter in a middle portion of approximately 4 inches (10 cm) and approximately 1½-2⅜ inches (3.8-6 cm) in the top and bottom portions. The exhaust channel 332 includes an inlet end 334 and an outlet end 336. The inlet end 334 of the exhaust channel 332 connects to the chamber 16. In this embodiment, the outlet end 336 of the exhaust channel 332 is open to ambient air, or alternatively, the outlet end 336 of the exhaust channel 332 is ventilated to outside air via ductwork or other means. The outlet end 336 may also be connected to a collection canister, such as the canister 128 in FIG. 2.

In the multi-channel unit 300 shown in FIG. 4, the air supply channel 320 passes through a wall of the exhaust channel 332 so that the horizontal portion 322 of the air supply channel 320 is outside the exhaust channel 332 but the vertical portion 324 of the air supply channel 320 is located within the exhaust channel 332. In this embodiment, the vertical portion 324 of the air supply channel 320 is spaced away from an inside wall of the exhaust channel 332. In this embodiment, the outlet end 330 of the air supply channel 320 does not extend to the outlet end 336 of the exhaust channel 332 but instead the outlet end 330 of the air supply channel 320 is located inside the exhaust channel 332.

Extending between the interior wall of the exhaust channel 332 and an outer wall of the vertical portion 324 of the air supply channel 320 is a baffle 360. In this embodiment, the baffle 360 is formed by a spiral fin extending along the interior wall of the exhaust channel 332 and the outer wall of the vertical portion 324 of the air supply channel 320. In this embodiment, the baffle 360 extends from near the region where the outlet end 330 of the air supply channel 320 ends inside the exhaust channel 332 to near a bottom of the exhaust channel 332 at the inlet 334.

Located in the inlet duct 350 is a fan 370. The fan 370 is powered by a motor 380. In this embodiment, the fan 370 operates at approximately 360 cubic feet per minute although other flow rates may be used. Located in or connecting to the air supply channel 320 and the exhaust channel 332 are sensors 382. The sensors 382 are located in various positions along the flow paths in the air supply channel 320 and the exhaust channel 332. These sensors 382 measure flow, temperature, and pressure, and may measure other operating parameters at these locations. The sensor 382 provide outputs to the logic controller (99 in FIG. 1) to monitor and control operation.

D. Operation of the Second Embodiment of the Exhaust System

Operation of the embodiment of the exhaust system 280 in FIG. 4 is similar to the operation of the embodiment 80 in FIG. 2. The fan 370 is operated to cause air to flow through the air supply channel 320. In this embodiment, the fan 370 also causes an increase in pressure inside the air supply channel 320. Air flow through the air supply channel 320 causes a reduction of pressure in the region at the outlet end 330 of the air supply channel 320 where it opens into the exhaust channel 332. This reduction in pressure in this region at the outlet end 330 of the air supply channel 320 inside the exhaust channel 332 causes air to flow from the chamber 16 up into and through the exhaust channel 332.

The outside air being caused to flow through the air supply channel 320 cools the hot air being drawn into the exhaust channel 332 from the chamber 16 causing the vapor in it to condense. This condensation forms into liquid droplets 166 inside the exhaust channel 332 around the vertical portion 324 of the air supply channel 320 and in the region at the outlet end 330 of the air supply channel 320. The droplets 166 fall back into the chamber 16. The baffle 360 inside the exhaust channel 332 directs the flow of condensate back into the chamber 16 and also helps keep heat inside the chamber 16. Condensate droplets that fall back into the chamber 16 become part of the fluid that is pumped to the nozzles 25 and 26 (in FIG. 1) and sprayed again.

E. Alternative Embodiment of the Multi-channel Unit

Figure 5:
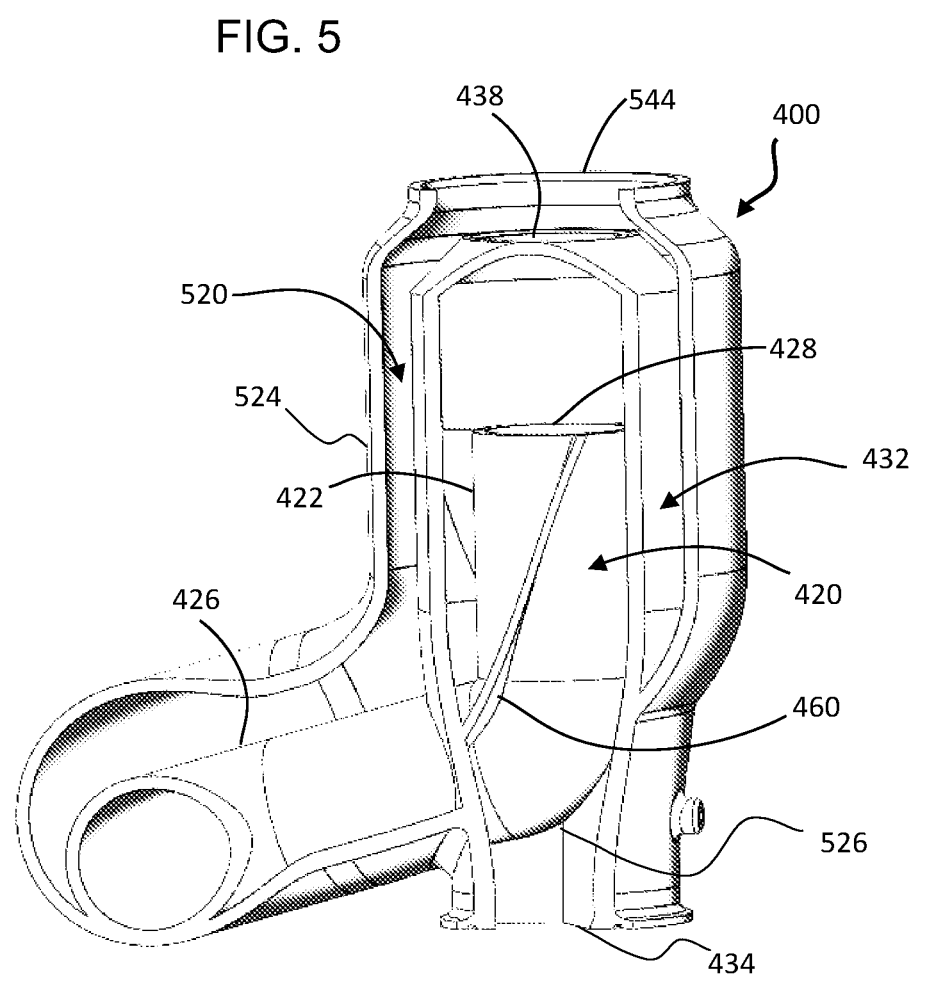
Figure 6:
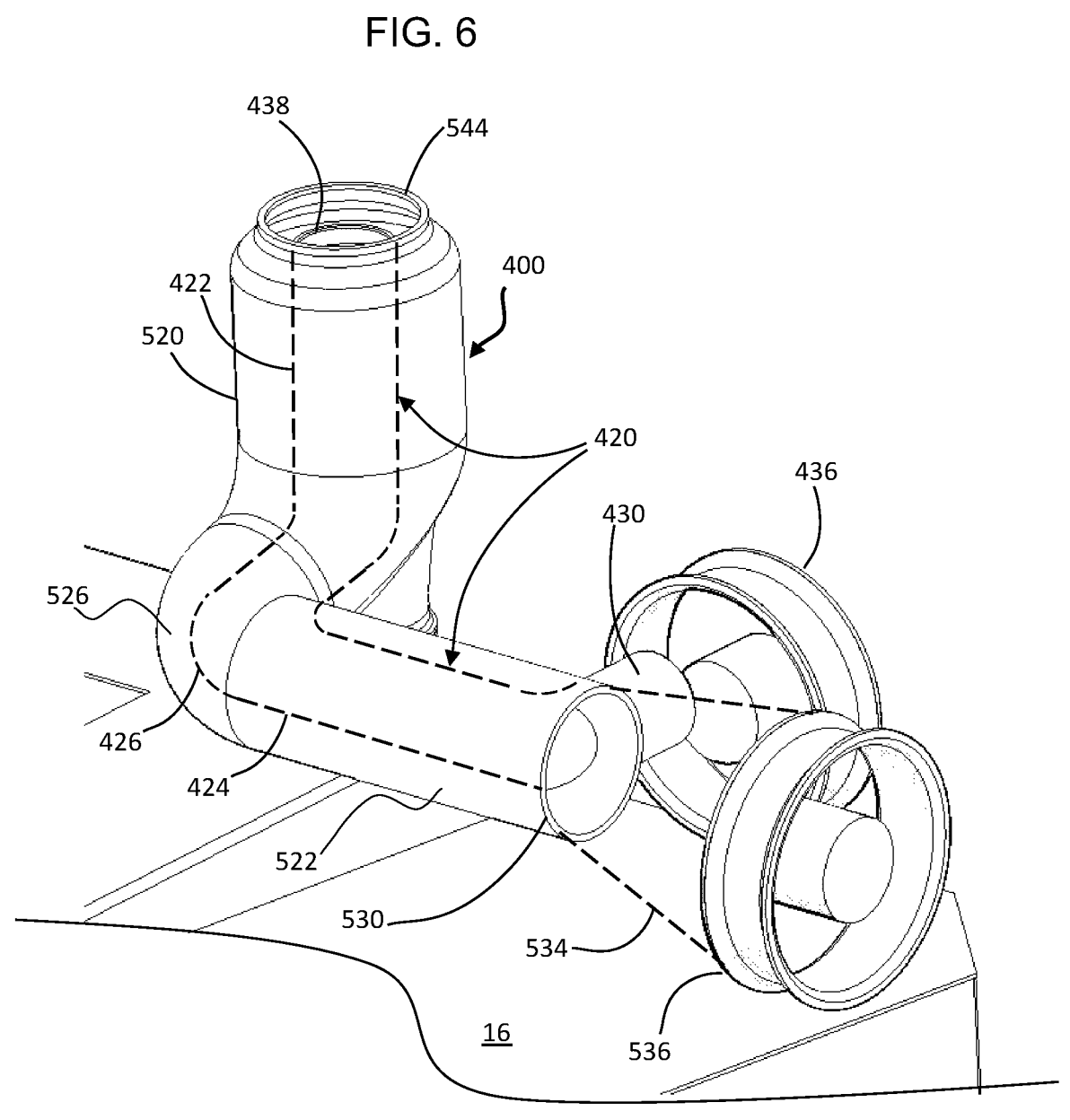
Figure 7:
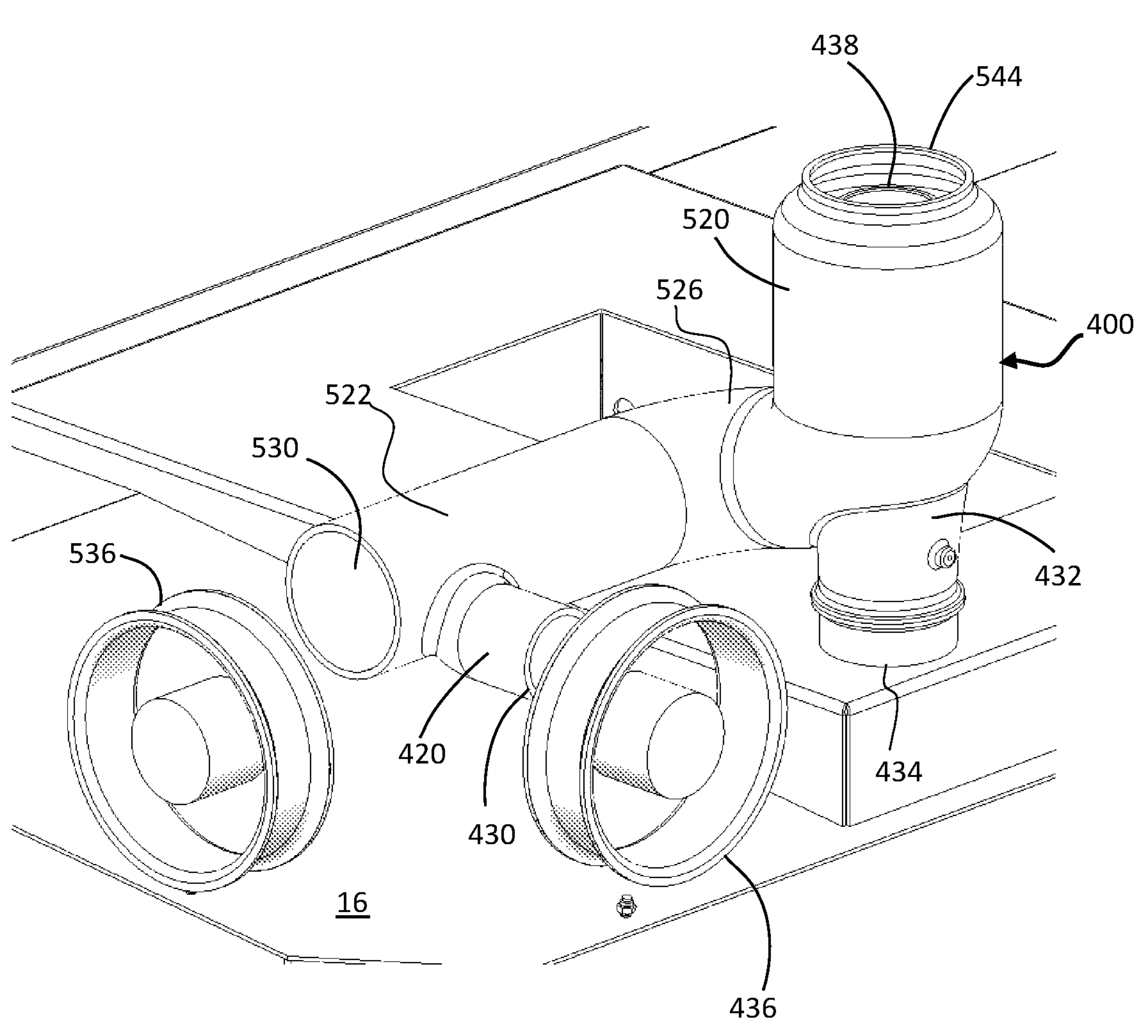
FIG. 7 is another perspective view showing the multi-channel unit of FIG. 5 mounted on the chamber of the apparatus for removing support material from additively manufactured parts shown in FIG. 1.

FIGS. 5, 6 and 7 show a multi-channel unit 400 that is an alternative embodiment of the multi-channel unit 300 in FIG. 4. Like the multi-channel unit 300 in FIG. 4, the multi-channel unit 400 in FIGS. 5, 6 and 7 is a component of an exhaust system used for removing vapor from and returning condensate to a chamber in which support material is removed from additively manufactured parts. The multi-channel unit 400 in FIGS. 5, 6 and 7 is similar to the multi-channel unit 300 in FIG. 4, except as explained as follows.

FIG. 5 shows a vertical cutaway view of the multi-channel unit 400 and FIGS. 6 and 7 are perspective views showing the multi-channel unit 400 mounted on the chamber 16 of the apparatus 8 for removing support material from additively manufactured parts. As shown in FIG. 5, the multi-channel unit 400 includes an exhaust channel 432. The exhaust channel 432 is similar to the exhaust channel 332 in the embodiment of the multi-channel unit 300 in FIG. 4. The exhaust channel 432 includes an inlet end 434 that connects to the chamber 16 (shown in FIGS. 6 and 7) and an outlet end 438 open to ambient air, outside air, or a collection canister. In one embodiment, the exhaust channel 432 has an inner diameter of approximately 2⅜ inches (6 cm).

As shown in FIG. 5, the multi-channel unit 400 includes multiple air supply channels, each of which provides a separate air flow path. The multi-channel unit 400 includes an inner air supply channel 420 and an outer air supply channel 520. The inner air supply channel 420 is similar to the air supply channel 320 in FIG. 4. Like the air supply channel 320 in FIG. 4, the inner air supply channel 420 in the embodiment in FIG. 5 is elbow-shaped. The inner air supply channel 420 includes a vertical portion 422, a horizontal portion 424 (not shown in FIG. 5, but indicated by the dashed line in FIG. 6), and an elbow portion 426 connecting the vertical portion 422 and the horizontal portion 424. Like the air supply channel 320 in FIG. 4, the inner air supply channel 420 in FIG. 5 has an outlet 428 that terminates inside the exhaust channel 432. In one embodiment, the inner air supply channel 420 has an inner diameter of approximately 1½ inches (3.8 cm).

As shown in FIG. 5, the outer air supply channel 520 is located outside of and around the exhaust channel 320. More specifically, the outer air supply channel 520 has an elbow shape with a vertical portion 524, a horizontal portion 522 (shown in FIG. 6), and an elbow portion 526 connecting the vertical portion 524 and the horizontal portion 522. The vertical portion 524 is located outside and surrounds the exhaust portion 432. The vertical portion 524 of the outer air supply channel 520 is spaced from the exhaust channel 432 thereby providing a flow path between an outside of the exhaust channel 432 and an inside wall of the outer air supply channel 520. A lower portion of the exhaust channel 432 extends through a wall of the elbow portion 526 of the outer air supply channel 520. The elbow portion 526 and the horizontal portion 522 of the outer air supply channel 520 surround the elbow portion 426 and horizontal portion 424 of the inner air supply channel 420. The elbow portion 526 and the horizontal portion 522 of the outer air supply channel 520 are spaced from the inner air supply channel 420 providing a flow path for the flow of air around the outside of the inner air supply channel 420. The outer air supply channel 520 has an outlet 544 at the top of the vertical portion 524. The vertical portion 524 of the outer air supply channel 520 has a length greater than the exhaust channel 432 so that the outlet 438 of the exhaust channel 432 is inside the vertical portion 524 of the outer air supply channel 520. In one embodiment, the vertical portion 524 of outer air supply channel 520 has an inner diameter of approximately 4 inches (10 cm) and the horizontal portion 522 of the outer air supply channel 520 has an inner diameter of approximately 2 inches (5 cm).

As shown in FIG. 6, the inner air supply channel 420 has an inlet 430 and the outer air supply channel 520 has an inlet 530. The inlet 530 of the outer air supply channel 520 connects to a duct (not shown but the outline of which is indicated by the dashed lines 534). The inlet 430 of the inner air supply channel 420 connects to a duct (not shown). Located in the duct 534 connected to the outer air supply channel 520 is a fan and motor assembly 536. Located in the duct connected to the inner air supply channel 420 is a fan and motor assembly 436. The fan and motor assemblies 436 and 536 are connected to an electrical source (not shown) of the apparatus 8. As shown in FIGS. 6 and 7, the inlet 430 of the inner supply channel 420 is oriented 90 degrees to the inlet 530 of the outer air supply channel 520.

Referring again to FIG. 5, located between an inner wall of the vertical portion of the exhaust channel 432 and an outer wall of the vertical portion 422 of the inner air supply channel 420 is a baffle 460. The baffle 460 is similar to the baffle 360 in FIG. 4.

Operation of the embodiment of the exhaust system with the multi-channel unit 400 in FIGS. 5, 6, and 7 is similar to the operation of the embodiment with the multi-channel unit 300 in FIG. 4. In the embodiment in FIGS. 5, 6, and 7, the fans 436 and 536 draw in ambient air via both the inner air supply channel 420 and the outer air supply channel 520. The air flow out of the inner air supply channel 420 and the outer air supply channel 520 draws air through the exhaust channel 420 from the chamber 16. The relatively cooler ambient air passing through both the inner air supply channel 420 and the outer air supply channel 520 draws heat from the exhaust channel 420 causing the vapor in it to condense. Condensation also occurs in the regions around the outlet 428 of the inner air supply channel 420 and the outlet 438 of the exhaust channel 432 which is inside the outlet 544 of the outer air supply channel 520. An advantage of the embodiment of the multi-channel unit 400 is that the air in the exhaust channel 432 is cooled by the relatively cooler ambient air being caused to flow through the inner air supply channel 420 located inside the exhaust channel 432 as well as the relatively cooler ambient air being caused to flow through the outer air supply channel 520 surrounding the exhaust channel 432.

F. Multiple Unit Exhaust System Embodiment

Figure 8:
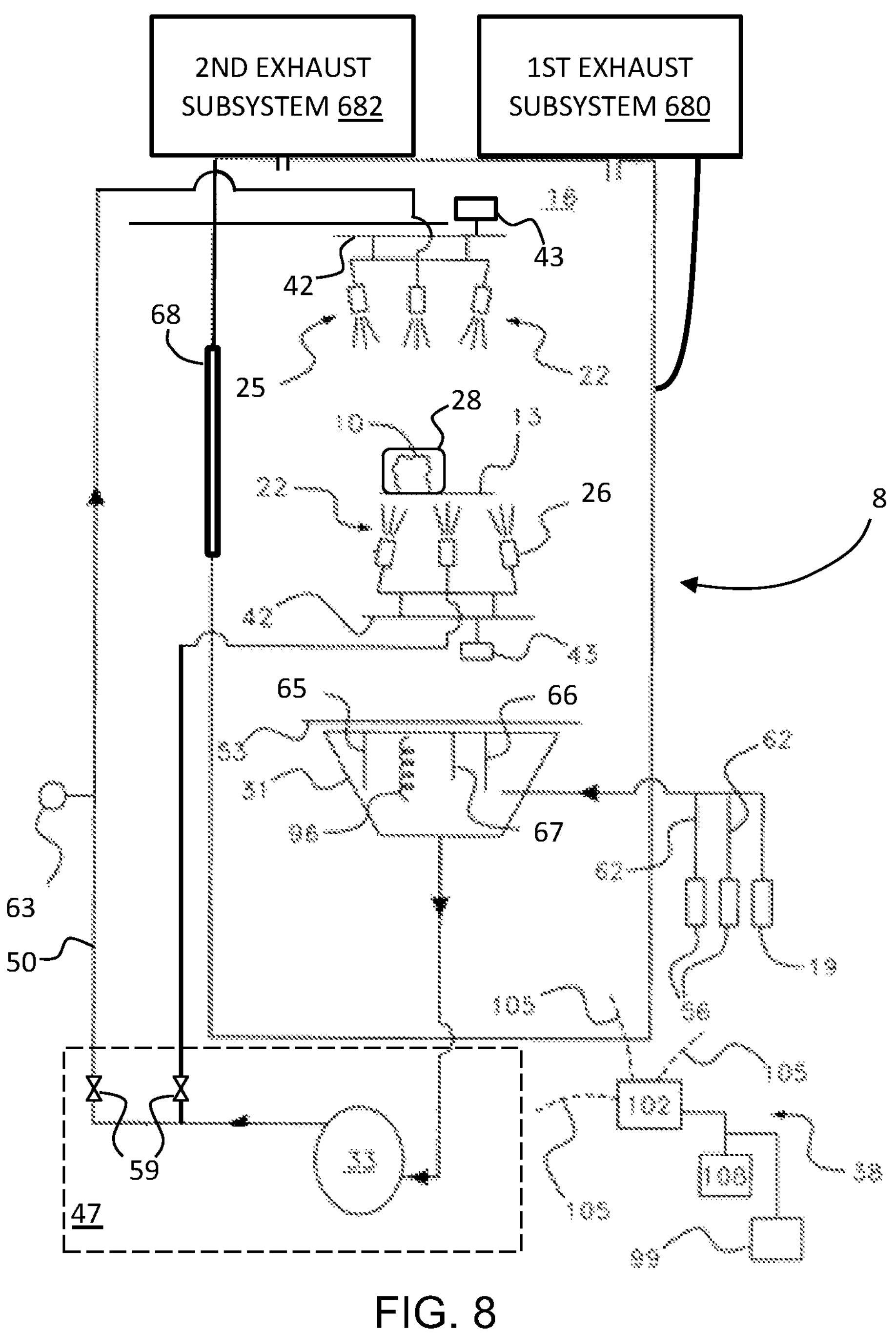
FIG. 8 is a schematic depiction similar to FIG. 1 showing an alternative embodiment that employs multiple units of the multi-channel units shown in FIG. 4 or 5.

FIG. 8 is a schematic depiction similar to FIG. 1. FIG. 8 shows an alternative embodiment that employs multiple units of the multi-channel units shown in FIGS. 4-7. The numerals in FIG. 8 refer to components corresponding to those components shown in FIG. 1.

In FIG. 8, the apparatus 8 has a first exhaust subsystem 680 and a second exhaust subsystem 682. The first exhaust subsystem 680 and a second exhaust subsystem 682 each include a separate multi-channel unit, such as the unit 300 in FIG. 4 or the unit 400 in FIGS. 5-7. The first exhaust subsystem 680 and a second exhaust subsystem 682 each communicate with and receive volatile air from the chamber 16. The first exhaust subsystem 680 and the second exhaust subsystem 682 may each connect directly to the chamber 16 via separate orifices, or alternatively the first exhaust subsystem 680 and the second exhaust subsystem 682 may connect via tubing or ducts via a manifold or other means to single or multiple orifices into the chamber 16.

The exhaust subsystems 680 and 682 may be operated concurrently, alternately, at the same speeds, different speeds, or according to other operating parameters.

The multi-channel units used in the first exhaust subsystem 680 and the second exhaust subsystem 682 may be the same or the multi-channel units used in the first exhaust subsystem 680 and the second exhaust subsystem 682 may be different.

In a further alternative embodiment, an apparatus for removing support material from additively manufactured parts may include more than two exhaust subsystems, such as three, four or more.

III. Other Alternative Embodiments

Non-Continuous Operation

It was stated above that in one mode of operation, the exhaust system can run continuously, i.e., during the entire cycle time during which the apparatus 8 is operated to remove support material from additively manufacture parts. In an alternative mode, the exhaust system can be operated intermittently.

Retrofit

As stated above, PostProcess Technologies, Inc., of Buffalo, NY, has developed the BASE™ and the DECI™ support removal solutions to address the need for support removal from additively manufactured parts. These models of machines are in service and being used to remove support material from additively manufactured parts. Older models of these machines do not have an exhaust system like the one disclosed herein. In a further aspect of the invention, an embodiment of the disclosed exhaust system can be retrofitted onto models of support removal machines that do not have one.

These older model machines have an exhaust stack located in the top wall of the chamber. An exhaust stack like the one in these older models is depicted at 78 in FIG. 1 of US 20190202126A1. The exhaust stack in these older models may have a fan located therein to draw air from the chamber. Alternatively, the exhaust stack may not have a fan. According to this aspect of the invention, the exhaust stack 78 is removed and replaced with an exhaust system like the exhaust system 80 disclosed herein. The stack 78 is removed by removing the screws that keep it in place. Then, the exhaust system is retrofitted in place of the removed exhaust stack. The inlet end of the exhaust channel is fitted through the opening in the top of the chamber from which the exhaust stack was removed. Then the rest of the exhaust system is bolted in place. If the older machine had a collection canister with a drain, the new collection canister and drain can replace the old collection canister and drain. If the older machine did not have a collection canister and drain, an opening is drilled into the side of the chamber so that the drain from the new collection canister can be fitted. Alternatively, an older machine can be retrofitted with an exhaust system that does not use a collection canister. The fan motor in the new exhaust system is connected to the electrical power source in the older model machine. An upgrade in the operation software is installed to operate the new exhaust system.

Air Inlet

Embodiments of the system disclosed herein provide for exhausting heated air containing evaporated fluids from a chamber in which support material is removed from additively manufactured parts and recovering some or all the evaporated fluids. Embodiments of the system can also provide for ventilation of the chamber in which support material is removed from additively manufactured parts. In some embodiments, the chamber is provided with an air inlet. The air inlet connects to a source of air (such as ambient air). The air inlet may have a valve or other means of opening and closing to regulate or control air being drawn into the chamber.

Multiple Air Supply Inlets

The embodiment of the multi-channel unit 400 in FIGS. 5-7 included two air supply channels. In alternative embodiments, multi-channel units may have more than two air supply channels. Each air supply channel may have a separate inlet and fan to draw ambient air.

Embodiments without Fans

The embodiments of the exhaust systems described above include fans to draw cooler air to condense vapor in an exhaust of an apparatus that removes support material from additively manufactured parts. In alternative embodiments, the exhaust systems can be used without fans. These embodiments can draw outside relatively cooler air to condense vapor in an exhaust without the use of fans.

Other Embodiments

In a further alternative, the condensation that takes place in and outside the exhaust channel can be enhanced by providing additional cooling around the exhaust channel, such as by supplemental air cooling, e.g., air conditioning to further cool the incoming air from the air source, and/or providing a water-cooled outer jacket around the exhaust channel.

IV. Advantages

An advantage of the disclosed exhaust system is that makes operation of the support removal apparatus more efficient. The exhaust system causes significant amounts of evaporated fluids and VOCs to condense and return to the chamber allowing these fluids to be reused for spraying at parts to remove support material. Without the exhaust system, these evaporated fluids and VOCs would escape and not be reused. This allows for conservation of the fluid and provides for more efficient operation.

Another advantage is that the exhaust system makes it easier to maintain the fluid at a desired temperature for support removal. The exhaust system causes significant amounts of evaporated fluids and VOCs to condense and return to the chamber. These evaporated fluids and VOCs that condense and return to the chamber contain significant amounts of heat, which is returned to the chamber, thereby making it easier to maintain the fluid at the desired temperature for support removal.

Still another advantage of the exhaust system is that the fan used to draw the air from the chamber is located outside the flow of heated air from the chamber. The heated air from the chamber contains evaporated fluids and VOCs. These evaporated fluids and VOCs can cause wear on the fan. By having the fan upstream of the location at which the evaporated fluids and VOCs enter the exhaust channel, the fan is spared the wear that would otherwise be caused by the evaporated fluids and VOCs.

In the foregoing description, example embodiments are described. The specification and drawings are accordingly to be regarded in an illustrative rather than a restrictive sense.

It will be appreciated that various aspects of the above-disclosed invention and other features and functions, or alternatives thereof, may be desirably combined into many other different systems or applications. Various presently unforeseen or unanticipated alternatives, modifications, variations, and/or improvements therein may be subsequently made by those skilled in the art, and those alternatives, modifications, variations, and/or improvements are intended to be encompassed by the following claims.

Although the present invention has been described with respect to one or more particular embodiments, it will be understood that other embodiments of the present invention may be made without departing from the spirit and scope of the present invention. Hence, the present invention is deemed limited only by the appended claims and the reasonable interpretation thereof.

The invention claimed is:

1. An exhaust system for an apparatus that removes support material from an additively manufactured part, wherein the apparatus comprises:
- a chamber; and
- a spray header in the chamber and oriented to spray a fluid at the additively manufactured part,
- wherein the exhaust system comprises:
- an air supply channel having an inlet for receiving ambient air and an outlet; and
- an exhaust channel having an inlet end communicating with the chamber and an outlet end that opens to ambient air, wherein the exhaust channel is located in proximity to said air supply channel so that air drawn from the chamber through the exhaust channel imparts heat to the air supply channel to cause condensation of vapor in the air drawn from the chamber to occur.

2. An exhaust system for an apparatus that removes support material from an additively manufactured part, wherein the apparatus comprises:
- a chamber; and
- a spray header in the chamber and oriented to spray a fluid at the additively manufactured part,
- wherein the exhaust system comprises:
- an air supply channel having an inlet for receiving air and an outlet; and
- an exhaust channel having an inlet end communicating with the chamber and an outlet end, wherein a portion of the air supply channel is located inside a portion of the exhaust channel, wherein the exhaust channel is located in proximity to said air supply channel so that air drawn from the chamber through the exhaust channel imparts heat to the air supply channel to cause condensation of vapor in the air drawn from the chamber to occur.

3. The exhaust system of claim 2 wherein the outlet of the air supply channel is located inside the exhaust channel.

4. An exhaust system for an apparatus that removes support material from an additively manufactured part, wherein the apparatus comprises:

a chamber; and a spray header in the chamber and oriented to spray a fluid at the additively manufactured part, wherein the exhaust system comprises:

an air supply channel having an inlet for receiving air and an outlet; and an exhaust channel having an inlet end communicating with the chamber and an outlet end, wherein a portion of the exhaust channel is located inside a portion of the air supply channel, wherein the exhaust channel is located in proximity to said air supply channel so that air drawn from the chamber through the exhaust channel imparts heat to the air supply channel to cause condensation of vapor in the air drawn from the chamber to occur.

5. The exhaust system of claim 4 wherein the outlet of the exhaust channel is located inside the air supply channel.

6. The exhaust system of claim 1 wherein the air supply channel comprises:

an inner air supply channel at least a portion of which is located inside the exhaust channel; and an outer air supply channel at least a portion of which is located outside the exhaust channel.

7. The exhaust system of claim 6 wherein an outlet of the inner air supply channel is located inside the exhaust channel and wherein the outlet end of the exhaust channel is located inside an outlet of the outer air supply channel.

8. The exhaust system of claim 1 further comprising:

a baffle located in the exhaust channel.

9. The exhaust system of claim 1 further comprising:

at least one sensor located in at least one of the air supply channel and the exhaust channel, wherein the at least one sensor senses at least one of temperature, pressure, and flow.

10. The exhaust system of claim 1 further comprising:

a fan located to cause air to flow into the air supply channel.

11. The exhaust system of claim 1 wherein the air supply channel and the exhaust channel are formed of a single multi-channel unit.

12. The exhaust system of claim 1 further comprising:

a first subsystem, wherein the first subsystem includes the air supply channel and the exhaust channel; and a second subsystem, wherein the second subsystem includes a second air supply channel and a second exhaust channel, wherein the second air supply channel includes a second air supply channel inlet for receiving air and a second air supply channel outlet and wherein the second exhaust channel includes a second exhaust channel inlet end communicating with the chamber and a second exhaust channel outlet end, wherein the second exhaust channel is located in proximity to said second air supply channel so that air flow through the second exhaust channel imparts heat to the second air supply channel to cause condensation of vapor in the air drawn from the chamber.

13. The exhaust system of claim 1 further comprising:

a collection cannister connected to receive air from either the outlet of said air supply channel or the outlet end of the exhaust channel; and a drain connected between a bottom of said collection cannister and said chamber, said drain operable to allow flow of liquid from said collection cannister back to said chamber.

* * * * *